US009704452B2

(12) United States Patent
Sun et al.

(10) Patent No.: US 9,704,452 B2
(45) Date of Patent: Jul. 11, 2017

(54) DISPLAY PIPELINE AND FRAME BUFFER INITIALIZATION FOR PRE-OPERATING SYSTEM ENVIRONMENT

(71) Applicant: Intel Corporation, Santa Clara, CA (US)

(72) Inventors: Jiming Sun, Cupertino, CA (US); Philip Park, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/540,065

(22) Filed: Nov. 13, 2014

(65) Prior Publication Data

US 2016/0140683 A1 May 19, 2016

(51) Int. Cl.
*G06T 1/20* (2006.01)
*G09G 5/00* (2006.01)
*G09G 5/02* (2006.01)

(52) U.S. Cl.
CPC ............... *G09G 5/005* (2013.01); *G09G 5/02* (2013.01); *G09G 2340/0407* (2013.01); *G09G 2350/00* (2013.01)

(58) Field of Classification Search
None
See application file for complete search history.

(56) References Cited

U.S. PATENT DOCUMENTS

| | | | | |
|---|---|---|---|---|
| 2007/0247413 | A1* | 10/2007 | Maruyama | G09G 3/2011 345/101 |
| 2008/0312964 | A1* | 12/2008 | Smith | G06F 19/327 705/3 |
| 2010/0001933 | A1* | 1/2010 | Coker | G02F 1/133308 345/83 |
| 2011/0057963 | A1* | 3/2011 | Lee | G09G 5/02 345/690 |
| 2011/0157181 | A1* | 6/2011 | Diard | G09G 5/393 345/428 |
| 2013/0169613 | A1* | 7/2013 | Chen | G09G 3/3611 345/212 |
| 2014/0208442 | A1* | 7/2014 | Mooring | G06F 9/45533 726/30 |

* cited by examiner

*Primary Examiner* — Jacinta M Crawford
(74) *Attorney, Agent, or Firm* — Forefront IP Lawgroup of Christie and Rivera, PLLC

(57) ABSTRACT

Described herein are technologies related to a method of initializing and configuring a display pipeline for a graphic support in a pre-operating system (pre-OS) environment.

20 Claims, 7 Drawing Sheets

DISPLAY PIPELINE AND FRAME BUFFER INITIALIZATION FOR PRE-OPERATING SYSTEM ENVIRONMENT

BACKGROUND

Customers implementing embedded graphics market desire a pre-operating system (pre-OS) graphics solution for embedded applications. Traditionally, Graphics Output Protocol (GOP) is suggested for use of customers; however, the GOP requires a unified extensible firmware interface (UEFI) codebase and as such, the customers who are not using the UEFI codebase may not be able to utilize the recommended GOP. Furthermore, the UEFI code has been developed by the Unified EFI Forum industry group to enhance the booting process of modern computer systems; however, not all problems in the boot process have been addressed by the UEFI standard and/or known techniques.

In a solution, VGA BIOS, or VBIOS, is available to customers; however, the VBIOS is large in physical size, and slow in performance due to its legacy nature to provide backwards compatibility. Furthermore, VBIOS is not suitable for systems without legacy BIOS interfaces and require faster response time.

In another solution, embedded pre-OS graphics (EPOG) code may also be released to the customers; however, the EPOG are not readily or oftentimes available for customers' consumption. Furthermore, the EPOG code is derived from Linux drivers and is more complicated than necessary.

As such, there is a need to address various concerns and provide better solutions to customer. Ideally such solutions improve the boot process. Such solutions should provide fast boot time, have a small physical foot print, be simple to integrate, have no dependency on the firmware or source code, and be simple to configure.

DETAILED DESCRIPTION

Described herein is a technology for initializing and configuring of a display pipeline for graphic support in a pre-Operating System (pre-OS) environment. For example, a Firmware Support Package-Display (FSP-D) device is configured to receive a user-provided parameter or parameters of a display device. The FSP-D device is further configured to detect or determine another set of parameters from a frame buffer. In this example, the FSP-D device may perform matching of the user-provided display device parameters and the frame buffer parameters to find the parameters that satisfies both of the user-provided display device parameters and the frame buffer parameters.

With the determined matched parameters, the FSP-D device may utilize a look-up table to find an optimal value for a display device register setting (e.g., per display type and mode). The optimal value, for example, is provided to the display device to implement the initializing and the configuring of the display pipeline for the graphic support in the pre-OS environment.

In another implementation, the other GFX (graphics) firmware such as VBIOS/GOP detects and determines the display device parameters rather than receiving them as user-provided parameters. In this implementation, the same procedure as discussed above may be implemented to determine the optimal value using the look-up table. That is, the FSP-D performs matching of the display device and frame buffer parameters and based from the matched parameters, the optimal value is determined using the look-up table.

Figure 1:
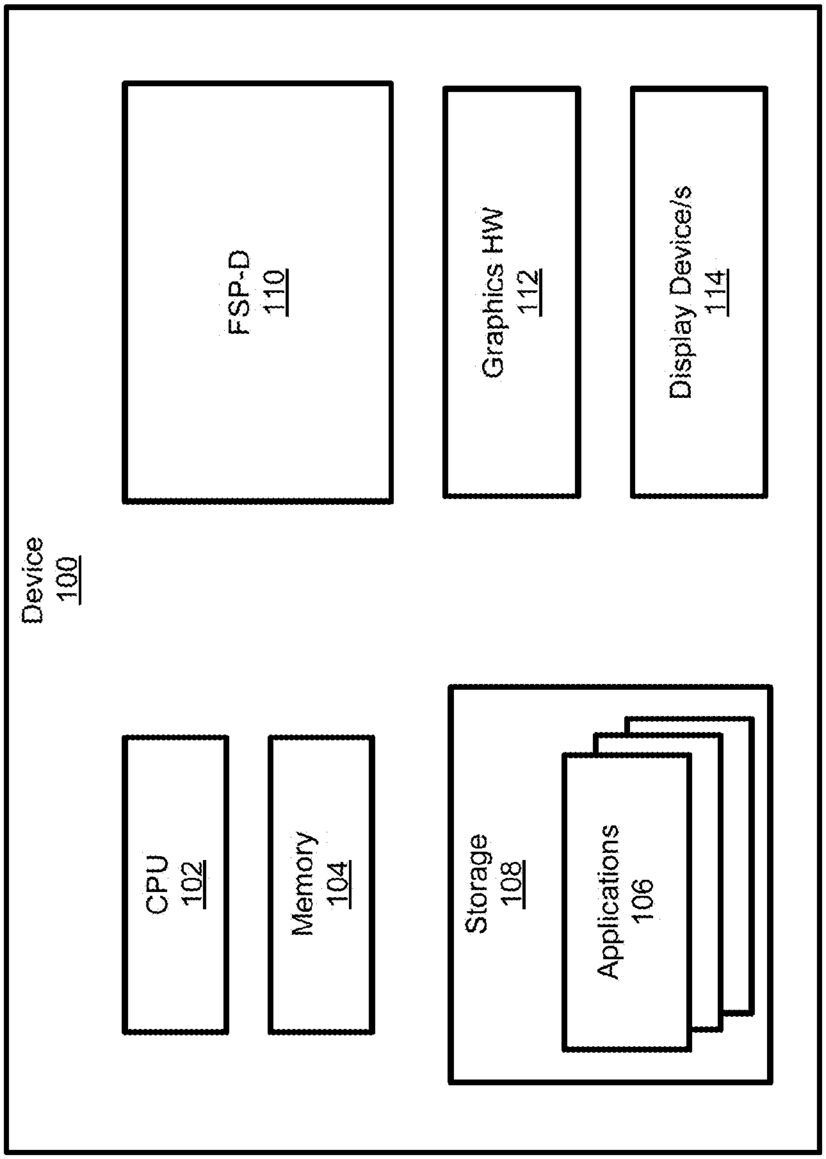
FIG. 1 illustrates an example block diagram of a computing device used in accordance with implementations described herein.

FIG. 1 is an example block diagram of a computing device 100 that may be used in accordance with implementations described herein. The computing device 100 may include a control processing unit (CPU) 102, a memory device 104, one or more applications 106 from a storage 108, a FSP-D component 110, a graphics hardware 112, and a display device 114.

Example computing device 100 may be a laptop computer, desktop computer, tablet computer, mobile device, or server, among others. In this example, the computing device 100 may include the CPU 102 configured to execute stored instructions, as well as the memory device 104 that stores instructions, which are executable by the CPU 102. The CPU 102 may control and coordinate the overall operations of the computing device 100. Furthermore, the CPU 102 may be a single core processor, a multi-core processor, a computing cluster, or any number of other configurations.

In an implementation, the memory device 104 may include a main memory of the computing device 100. In addition, the memory device 104 may include any form of random access memory (RAM), read-only memory (ROM), flash memory, or the like. For example, the memory device 104 may be one or more banks of memory chips or integrated circuits. In this example, the CPU 102 may have direct access to the memory device 104 through a bus connection (not shown).

The instructions that are executed by the CPU 102 may be used to execute any of a number of applications 106 residing within the storage device 108 of the computing device 100. The applications 106 may be any types of applications or programs having graphics, graphics objects, graphics images, graphics frames, video, or the like, to be displayed to a user (not shown) through the display device 114. The storage device 108 may include a hard drive, an optical drive, a thumb drive, an array of drives, or any combinations thereof.

In an implementation, the FSP-D component 110 may include a processor, hardware, software, firmware, or a combination thereof to provide a graphic support in a pre-OS environment, or to implement pre-OS functions without the need, for example, of using the UEFI or depending upon a software driver. In this implementation, the software driver may need to be written in a specific way to provide a specific set of functions such as the pre-OS functions. The pre-OS functions, for example, may include showing of a local display, showing of a simple menu prior to the loading of the main OS, displaying a logo (e.g., splash screen), showing of an error message in the pre-OS environment, and the like.

In the pre-OS environment, the FSP-D component 110 may be configured to perform initialization of a display pipeline for the display device 114 in order to implement the above described pre-OS functions (i.e., local display, simple menu, error messages, etc.). For example, the FSP-D component 110 may detect or determine parameters of the display device 114. In this example, the FSP-D component 110 is configured to match the determined parameters of the display device 114 with another set of parameters from ROM or RAM frame buffer in memory 104 (not shown) in order to determine an optimal register setting for the initialization of the display pipeline.

With the determined optimal register setting, for example, the FSP-D 110 may utilize a look-up table (not shown) stored, for example, at the memory 104, to determine corresponding values of the display device register setting for the initialization of the display pipeline. Thus, the display device 114 may be set up without the need of the UEFI or the software driver that may require a higher amount of memory for purposes of initializing the display pipeline.

In another implementation, user-provided parameters for the display device 114 and user-provided parameters for the ROM or RAM frame buffer in memory 104 may be utilized for the matching and finding of the values of the display device register setting. As discussed above, the FSP-D component 110 utilizes the look-up table in finding the values of the display device register setting after the matching process. In this other implementation, the FSP-D component 110 need not detect or determine the display device parameters such as, for example, by reading XML data or a binary file from a database of the display device 114. Similarly, the FSP-D component 110 need not detect or determine the frame buffer parameters such as, for example, by reading XML data or a binary file from a database of the frame buffer because the user has provided already the said parameters for purposes, for example, of original equipment manufacturer (OEM) cases.

With continuing reference to FIG. 1, the graphics hardware 112 may act as an interface to the display device 114, which may refer to any on-board or plug in devices such as a graphics processing unit (GPU), video cards/players/instructions, audio/music players, and the like. In this implementation, the graphics hardware 112 may facilitate, for example, relaying of data from the frame buffer to the display device 114 during the pre-OS operations. That is, after the FSP-D component 110 has performed the initialization of the display pipeline configuration for graphic support purposes during the pre-OS operations.

It is to be understood that the described block diagram of FIG. 1 may include other additional components not shown in the computing device 100.

Figure 2:
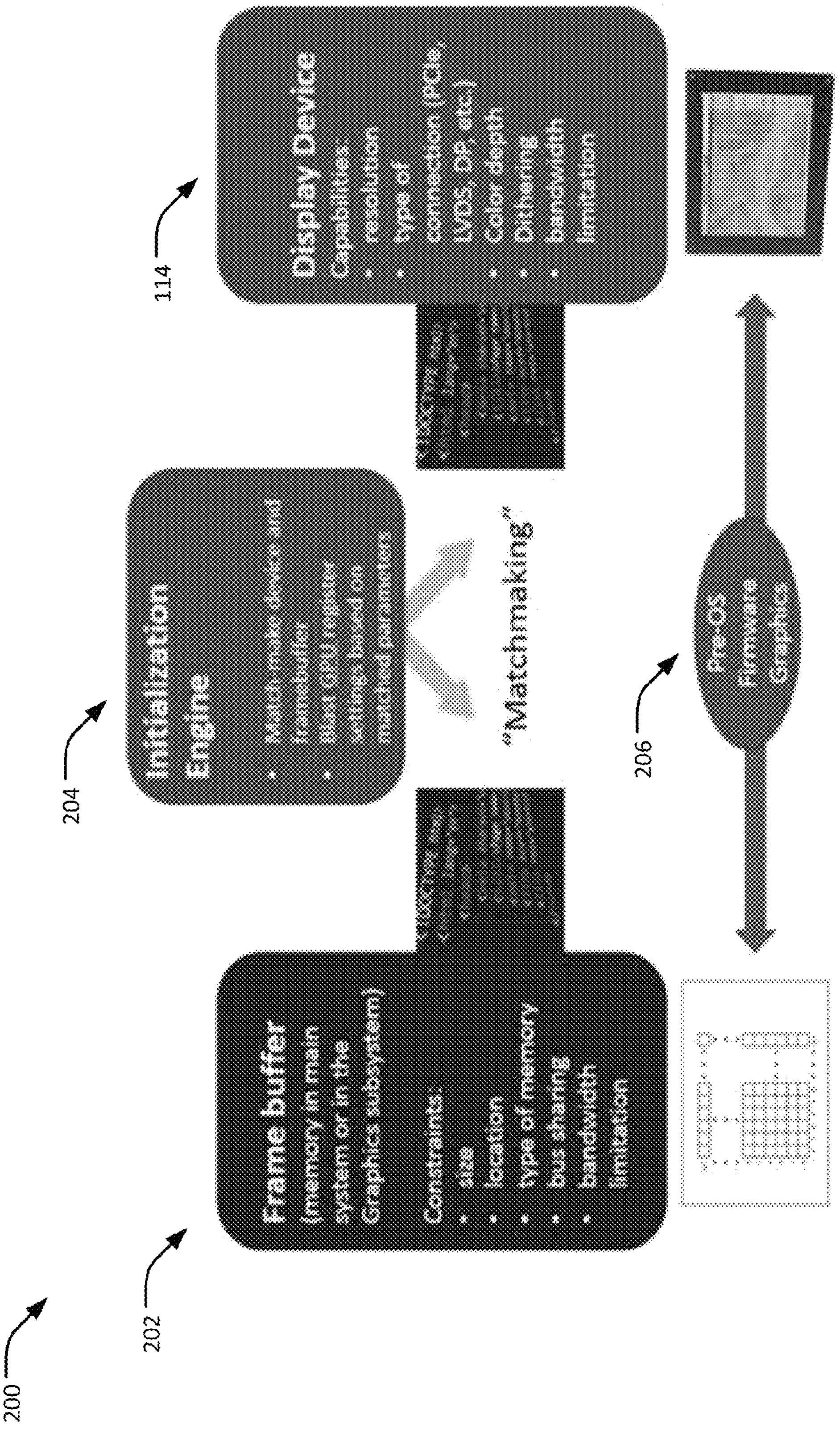
FIG. 2 illustrates an example overall view of implementing a display pipeline initialization as described in the present implementations herein.

FIG. 2 is an example overall view 200 of implementing a display pipeline initialization as described in the present implementations herein. As shown, the overall view 200 shows a frame buffer 202, an initialization engine 204, and the display device 114.

Prior to the loading of the main OS in the computing device 100, the initialization engine 204 may be configured to determine a first characteristic value, for example, of at least one media device (not shown) in the display device 114. The initialization engine 204, in this example, is an implementing component of the FSP-D component 110. As further discussed in FIG. 3 below, the initialization engine 204 and other components may form the FSP-D component 110 that is used for initialization and configuration of the display pipeline between the frame buffer 202 and the display device 114.

In an implementation, the first characteristic value of the at least one media device in the display device 114 may include parameters such as a resolution, type of connection (i.e., PCIe, LVDs, DP, etc.), color depth, dithering, bandwidth, limitation, and the like. In this implementation, the initialization engine 204 may be configured to detect or determine these parameters in the pre-OS environment or prior to the loading of the main OS. The detection or determination includes, for example, reading of the XML data or binary file from the database of the display device 114.

Thereafter, the initialization engine 204 may determine a second characteristic value, for example, of the frame buffer 202, which may be a part of the memory 104 or a part of a memory in a graphic subsystem (not shown) of the computing device 100. For example, the second characteristic value of the frame buffer 202 may include parameters such as size, location, type of memory, bus sharing, bandwidth limitation, and the like. In this example, the detection or determination of the second characteristic value includes, for example, reading of the XML data or binary file from the database of the frame buffer 202.

In an implementation, the initialization engine 204 is configured to compare or match the first and second characteristic values and based from the determined matched parameters or values, the initialization engine 204 utilizes the look-up table in finding optimal values for the display device register setting. In this implementation, the optimal values derived from the look-up table may provide the necessary mode, configuration or register setting of the display device 114 during the pre-OS operations. For example, based upon the derived optimal values from the look-up table, the display pipeline for the display device 114 is initialized and optimized for the best mode of transferring data from the frame buffer 202 to the display device 114. In this example, the transferred data is displayed at the display device 114.

In another implementation, a pre-calculated or a pre-configured first characteristic value of the display device 114 is received from the user and the pre-configured first characteristic value is compared with the detected/determined second characteristic value of the frame buffer 202 to determine the optimal values of the display device register setting. For example, instead of determining the parameters of the first characteristic value of the display device 114 as discussed above, the user-provided first characteristic value or parameters are used for finding the necessary configuration or the register setting of the GPU or the display device 114. With the determined necessary configuration, data from the frame buffer 202 may be flashed, for example, to the GPU registers of the display device 114.

With continuing reference to FIG. 2, a pre-OS firmware graphics 206 is shown to illustrate the facilitating of data transfer from the frame buffer 202 to the display device 114. The pre-OS firmware graphics 206, for example, is an algorithm that is implemented by the initialization engine 202.

Figure 3:
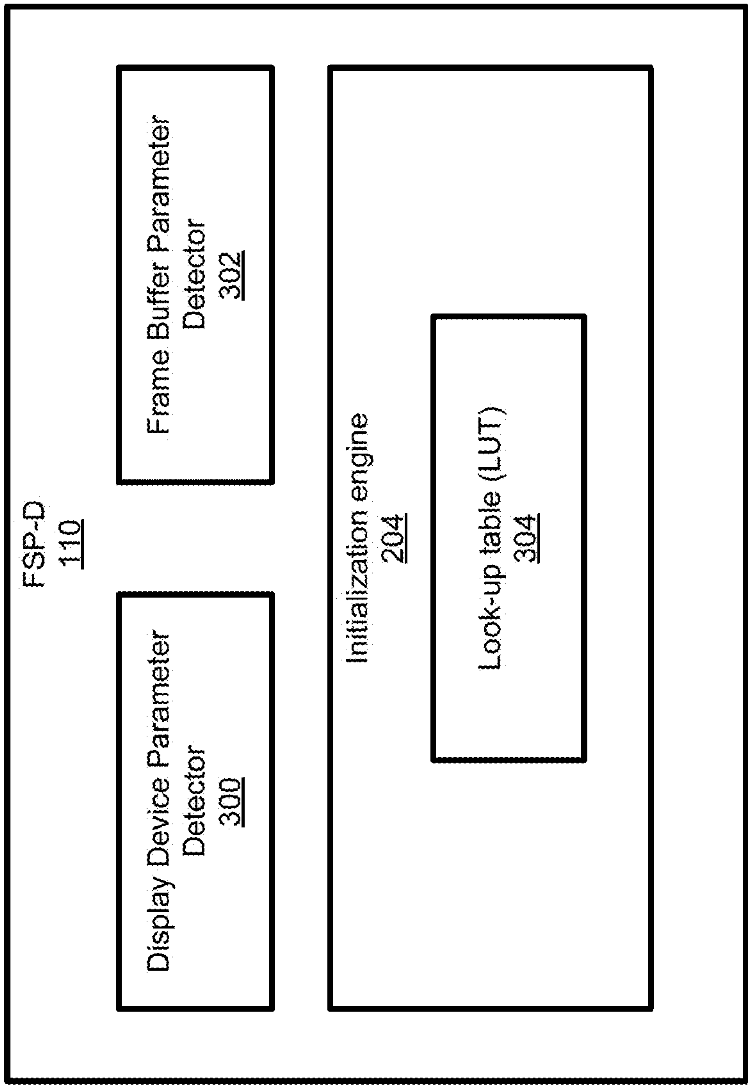
FIG. 3 is an example block diagram of a firmware support package-display (FSP-D) component as described in present implementations herein.

FIG. 3 is an example block diagram of the FSP-D component 110 as described in present implementations herein. As shown, the block diagram includes a display device parameter detector 300, a frame buffer parameter detector 302, the initialization engine 204, and a look-up table 304.

In a case of a pre-configured user-provided data such as, for example, where the display device parameters were provided already by the user for OEM purposes, the display device parameter detector 300 may not be needed as a component of the FSP-D component 110. In this example, the initialization engine 204 may determine the optimum configuration of the display pipeline based on the user-provided data rather than detecting the parameters (e.g., reading XML data) of the display device 114. The initialization engine 204, for example, utilizes the LUT 304 in finding the optimal values based on the matched parameters between the given user-provided data and the second characteristic value of the frame buffer 202. Similarly, where the user-provided data includes the desired parameters of the frame buffer 202, the frame buffer parameter detector 302 may not be required in finding the optimum configuration and initialization of the display pipeline as discussed above.

In a case where no user-provided data is made, for example, by the user, then the display device parameter detector 300 and the frame buffer parameter detector 302 are utilized to detect and determine the first and second characteristic values of the display device 114 and the frame buffer 202, respectively.

For example, during the pre-OS operation, one or more media devices are detected from the display device 114. In this example, the display device parameter detector 300 may be configured to determine the parameters of these one or more media devices. The parameters of these one or more media devices constitute the first characteristic value that includes the respective resolution, type of connection, color depth, etc. of the one or more media devices.

At the same instant, the frame buffer parameter detector 302 may be configured to determine the parameters or the second characteristic value of the frame buffer 202. With the determined first and second characteristic values, the initialization engine 204 may find, for example, the GPU parameters that may satisfy the first and second characteristic values. Based on the determined GPU parameters, the initialization engine 204 may utilize the LUT 304 to find the optimal configuration of the GPU register setting based on the found GPU parameters.

Figure 4:
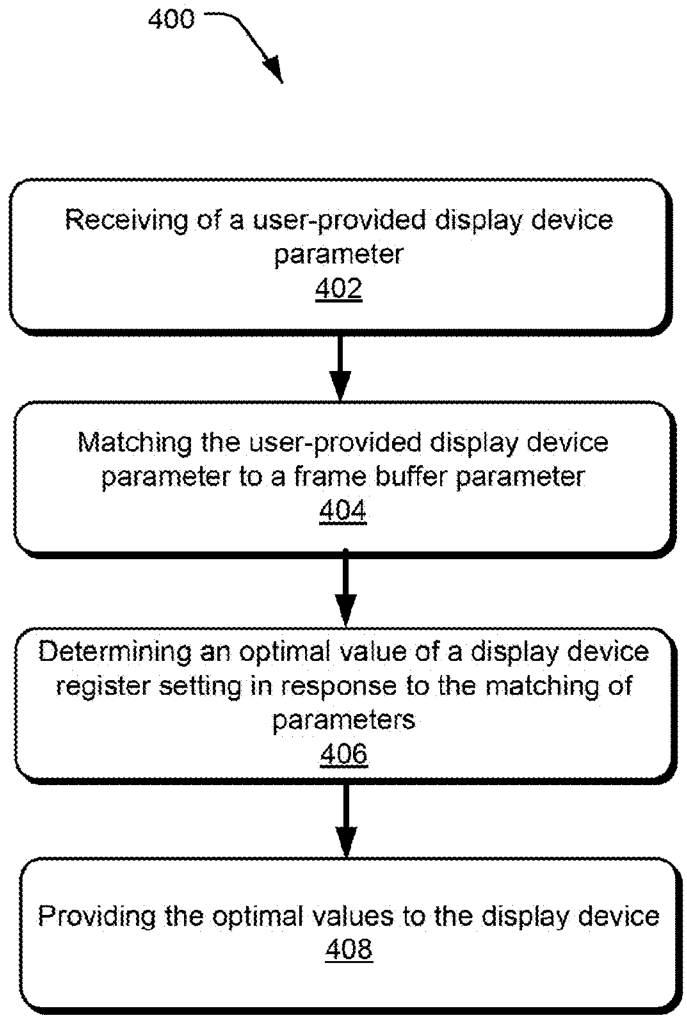
FIG. 4 illustrates an example flowchart for initializing a display pipeline and a frame buffer during a pre-OS operation in a computing device.

FIG. 4 shows an example process flowchart 400 illustrating an example method for initializing a display pipeline and frame buffer during a pre-OS operation in a computing device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving of a user-provided display device parameter is performed. For example, the user-provided display device parameter includes resolution, type of connection (i.e., PCIe, LVDs, DP, etc.), color depth, dithering, bandwidth, limitation, and the like, of a GPU (i.e., display device 114). In this example, the user-provided display device parameter constitutes the first characteristic value as described above.

At block 404, matching the user-provided display device parameter to a frame buffer parameter is performed. For example, the frame buffer parameter constitutes the second characteristic value that includes the size, location, type of memory, bus sharing, bandwidth limitation, and the like, of a particular frame buffer 202. In this example, the initialization engine 204 may be configured to match the first and second characteristic values of the display device 114 and the frame buffer 202, respectively.

In an implementation, the frame buffer parameter may be detected or determined by reading the XML data from the database of the frame buffer 202. In another implementation, the user may also provide a pre-calculated or pre-configured frame buffer parameter.

At block 406, determining an optimal value of a display device register setting in response to the matching of the user-provided display device parameter with the frame buffer parameter is performed. For example, the LUT 304 may be utilized by the initialization engine 204 in finding the optimal value for the display device register setting. The optimal value, in this case, is pre-determined per display type and mode prior to the packaging of the FSP-D component 110 (i.e., FSP-D device).

At block 408, providing the optimal values to the display device is performed. For example, the initialization engine 204 configures the display pipeline by providing the optimal values to the display device 114.

Figure 5:
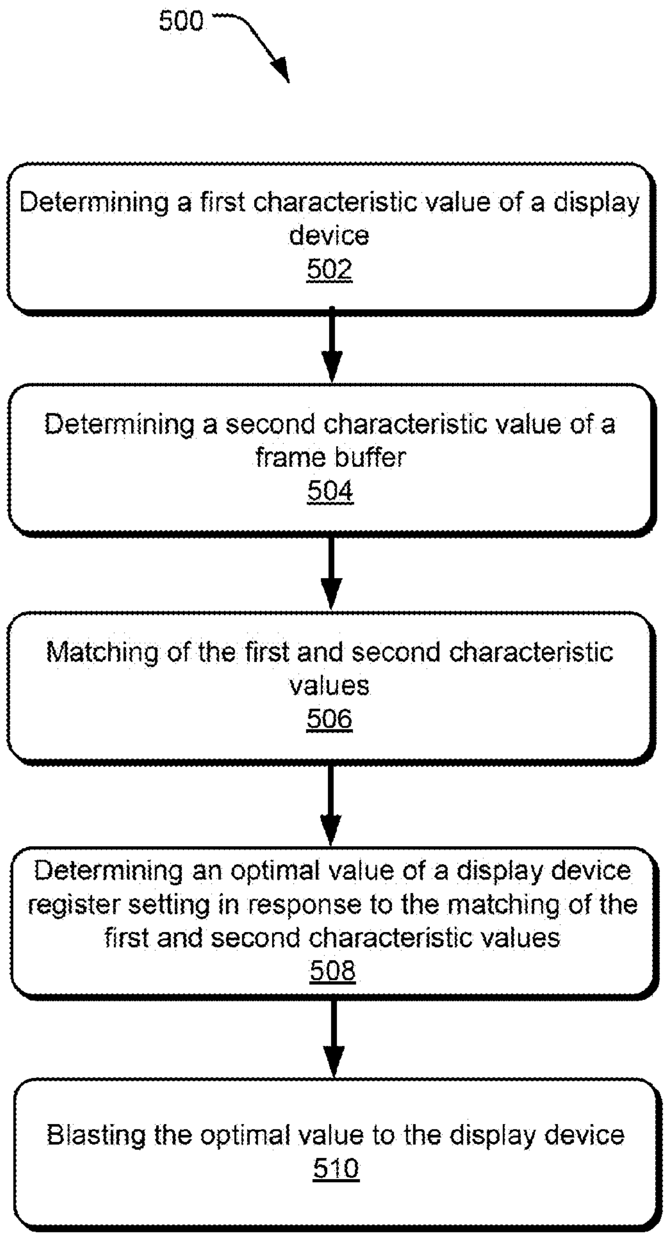
FIG. 5 illustrates an example flowchart illustrating an example method for initializing a display pipeline and a frame buffer during the pre-OS operation in a computing device.

FIG. 5 shows an example process flowchart 500 illustrating another example method for initializing the display pipeline and the frame buffer during the pre-OS operation in the computing device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, determining a first characteristic value of a display device is performed. For example, the display device parameter detector 300 reads a particular XML data or a binary file from a database of the display device 114.

At block 504, determining a second characteristic value of a frame buffer is performed. For example, the frame buffer parameter detector 302 reads another XML data or a binary file from a database of the frame buffer 202.

At block 506, matching of the first and second characteristic values to determine a display device register setting is performed. For example, the initialization engine 204 performs the matching of the first and second characteristic values to find the display device parameters that satisfy both first and second characteristic values. The matched parameters/settings may be attached (or direct binary modification) to the graphics binary code to be used, for example, by the display device 114 (i.e., GPU) so that pre-OS firmware may easily put out text or simple graphics to the frame buffer 202. The frame buffer 202, in this example, may include contents that are displayed seamlessly on the display device 114.

At block 508, determining an optimal value of a display device register setting in response to the matching of the first and second characteristic values is performed. For example, the LUT 304 may be utilized by the initialization engine 204 in finding the optimal value for the display device register setting per display type and mode.

At block 508, providing optimal values to the display device is performed.

Figure 6:
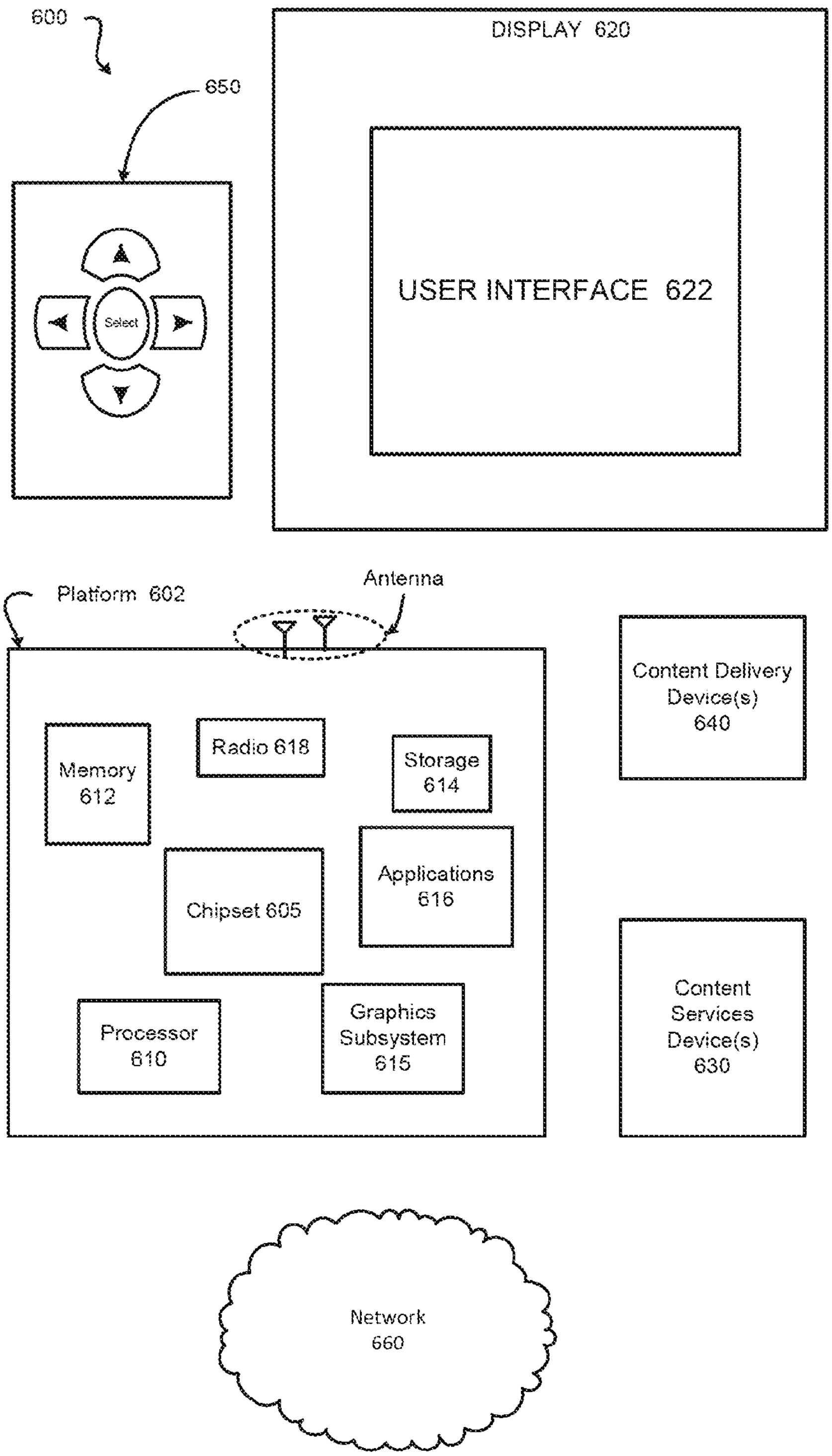
FIG. 6 illustrates an example computing device that implements preemption operation in a wireless device.

FIG. 6 illustrates another example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth that is coupled to the PIC as discussed in FIG. 2 above.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off" In addition, chipset 605 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 7:
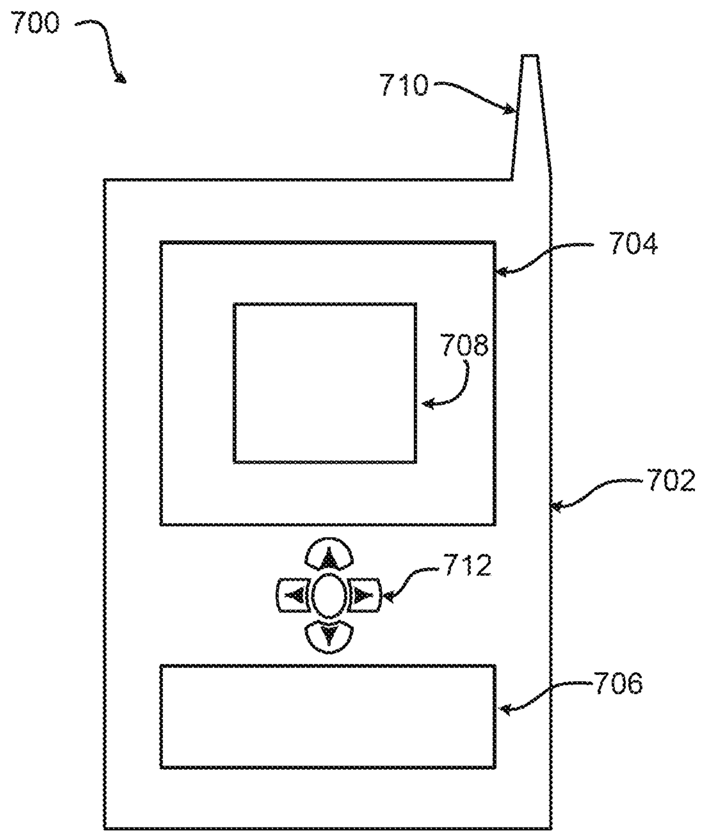
FIG. 7 illustrates an example device that implements self-disabling feature of a wireless device.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The following examples pertain to further embodiments:

Example 1 is a method of initializing a display pipeline that comprises determining a first characteristic value of a display device; determining a second characteristic value of a frame buffer; matching the first and second characteristic values; determining an optimal value in response to the matching of the first and second characteristic values, wherein the determining utilizes a look-up table to obtain the optimal value, and providing the optimal value to the display device.

In example 2, the method as recited in example 1, wherein the determining of the first characteristic value includes reading of an extensible markup language (XML) data from a database of the display device.

In example 3, the method as recited in example 1, wherein the first characteristic value includes a pre-calculated or a pre-configured user-provided data.

In example 4, the method as recited in example 1, wherein the first characteristic value includes one of a resolution, a connection type, a color depth, a dithering, a display bandwidth limitation of the display device.

In example 5, the method as recited in example 1, wherein the determining of the second characteristic value includes reading of an extensible markup language (XML) data from a database of the frame buffer.

In example 6, the method as recited in example 1, wherein the second characteristic value includes a pre-calculated or a pre-configured user-provided data.

In example 7, the method as recited in example 1, wherein the second characteristic value includes one of a size, a location, a memory type, a bus sharing, or a memory bandwidth limitation of the frame buffer.

In example 8, the method as recited in example 1, wherein the optimal value includes the optimal value of a register setting in the display device.

In example 9, the method as recited in any of examples 1-8, wherein the providing of the optimal value is performed in a pre-operating system (Pre-OS) environment.

Example 10 is device that comprises a display device parameter detector configured to determine a first characteristic value; a frame buffer parameter detector configured to determine a second characteristic value; and an initialization engine configured to match the first and second characteristic values, wherein the initialization engine utilizes a look-up table in determining an optimal value of a display device register setting in response to the matching of the first and second characteristic values.

In example 11, the method as recited in example 10, wherein the first characteristic value includes one of a resolution, a connection type, a color depth, a dithering, a display bandwidth limitation of the display device.

In example 12, the method as recited in example 10, wherein the first characteristic value includes a pre-calculated or a pre-configured user-provided data.

In example 13, the method as recited in example 10, wherein the second characteristic value includes a pre-calculated or a pre-configured user-provided data.

In example 15, the device as recited in any of examples 10-13, wherein the display device parameter detector determines the first characteristic value by reading an extensible markup language (XML) data from a database of the display device.

Example 15 is one or more computer-readable media storing processor-executable instructions that when executed cause one or more processors to implement a method of initializing a display pipeline, the method comprising: receiving of a user-provided first characteristic value of a display device; determining a second characteristic value of a frame buffer; matching the user-provided first characteristic value and the second characteristic value; determining an optimal value in response to the matching of the user-provided first characteristic value and the second characteristic value, wherein the determining utilizes a look-up table to obtain the optimal value, and providing the optimal value to the display device.

In example 16 the one or more computer-readable media as recited in claim 15, wherein the first characteristic value includes one of a resolution, a connection type, a color depth, a dithering, a display bandwidth limitation of the display device.

In example 17 the one or more computer-readable media as recited in claim 15, wherein the determining of the second characteristic value includes reading of an extensible markup language (XML) data from a database of the frame buffer.

In example 18 the one or more computer-readable media as recited in claim 15, wherein the second characteristic value includes a pre-calculated or a pre-configured user-provided data.

In example 19 the one or more computer-readable media as recited in claim 15, wherein the second characteristic value includes one of a size, a location, a memory type, a bus sharing, or a memory bandwidth limitation of the frame buffer.

In example 20 the one or more computer-readable media as recited in any of examples 15-19, wherein the optimal value includes the optimal value of a register setting in the display device.

What is claimed is:

1. A method of initializing a display pipeline in a pre-operating system (pre-OS) environment, the method comprising:

performing pre-operating system (pre-OS) operation in a pre-OS environment, the pre-OS environment exists on a computing device before loading of a main operating system (OS) and a pre-OS operation is an operation performed in a pre-OS environment, wherein the performing including:

determining a first characteristic value of a display device;

determining a second characteristic value of a frame buffer;

matching the first and second characteristic values;

determining an optimal value in response to the matching of the first and second characteristic values, wherein the determining includes deriving the optimal value from a look-up table and the optimal value is one that is optimized for transferring of data from the frame buffer with the second characteristic value to the display device with the first characteristic value; and providing the optimal value to the display device.

2. The method as recited in claim 1, wherein the determining of the first characteristic value includes reading of an extensible markup language (XML) data from a database of the display device.

3. The method as recited in claim 1, wherein the first characteristic value includes a pre-calculated or a pre-configured user-provided data.

4. The method as recited in claim 1, wherein the first characteristic value includes one of a resolution, a connection type, a color depth, a dithering, a display bandwidth limitation of the display device.

5. The method as recited in claim 1, wherein the determining of the second characteristic value includes reading of an extensible markup language (XML) data from a database of the frame buffer.

6. The method as recited in claim 1, wherein the second characteristic value includes a pre-calculated or a pre-configured user-provided data.

7. The method as recited in claim 1, wherein the second characteristic value includes one of a size, a location, a memory type, a bus sharing, or a memory bandwidth limitation of the frame buffer.

8. The method as recited in claim 1, wherein the optimal value includes the optimal value of a register setting in the display device.

9. The method as recited in claim 1, wherein the performing of pre-OS operations is performed independent of unified extensible firmware interface (UEFI) or a software driver.

10. A device comprising:

a display device parameter detector configured to determine a first characteristic value;

a frame buffer parameter detector configured to determine a second characteristic value; and an initialization engine configured to match the first and second characteristic values, wherein the initialization engine derives an optimal value of a display device register setting from a look-up table in response to the matching of the first and second characteristic values and the optimal value is one that is optimized for transferring of data from the frame buffer with the second characteristic value to the display device with the first characteristic value, wherein the display device parameter detector, the frame buffer parameter detector, and the initialization engine are further configured to operate in a pre-operating system (pre-OS) environment, the pre-OS environment exists on the device before loading of a main operating system (OS).

11. The device as recited in claim 10, wherein the display device parameter detector determines the first characteristic value by reading an extensible markup language (XML) data from a database of the display device.

12. The device as recited in claim 10, wherein the first characteristic value includes one of a resolution, a connection type, a color depth, a dithering, a display bandwidth limitation of the display device.

13. The device as recited in claim 10, wherein the first characteristic value includes a pre-calculated or a pre-configured user-provided data.

14. The device as recited in claim 10, wherein the second characteristic value includes a pre-calculated or a pre-configured user-provided data.

15. One or more non-transitory computer-readable media storing processor-executable instructions that when executed cause one or more processors to implement a method of initializing a display pipeline in a pre-operating system (pre-OS) environment, the method comprising:

performing pre-operating system (pre-OS) operation in a pre-OS environment, the pre-OS environment exists on a computing device before loading of a main operating system (OS) and a pre-OS operation is an operation performed in a pre-OS environment, wherein the performing including:

receiving of a user-provided first characteristic value of a display device;

determining a second characteristic value of a frame buffer;

matching the user-provided first characteristic value and the second characteristic value;

determining an optimal value in response to the matching of the first and second characteristic values, wherein the determining includes deriving the optimal value from a look-up table and the optimal value is one that is optimized for transferring of data from the frame buffer with the second characteristic value to the display device with the first characteristic value; and providing the optimal value to the display device.

16. The one or more non-transitory computer-readable media as recited in claim 15, wherein the first characteristic value includes one of a resolution, a connection type, a color depth, a dithering, a display bandwidth limitation of the display device.

17. The one or more non-transitory computer-readable media as recited in claim 15, wherein the determining of the second characteristic value includes reading of an extensible markup language (XML) data from a database of the frame buffer.

18. The one or more non-transitory computer-readable media as recited in claim 15, wherein the second characteristic value includes a pre-calculated or a pre-configured user-provided data.

19. The one or more non-transitory computer-readable media as recited in claim 15, wherein the second characteristic value includes one of a size, a location, a memory type, a bus sharing, or a memory bandwidth limitation of the frame buffer.

20. The one or more non-transitory computer-readable media as recited in claim 15, wherein the optimal value includes the optimal value of a register setting in the display device.

* * * * *